(12) United States Patent
Choi et al.

(10) Patent No.: US 10,938,242 B2
(45) Date of Patent: Mar. 2, 2021

(54) DISPLAY APPARATUS AND OPERATIONAL METHOD THEREFOR, AND ELECTRONIC APPARATUS

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Young-ho Choi, Suwon-si (KR); Chun Taek Rim, Gwangju (KR); Eun Soo Lee, Daejeon (KR); Young-chan Park, Hwaseong-si (KR); Kyu-sung Lee, Ansan-si (KR); Sang-min Lim, Yongin-si (KR); Tan Duy Nguyen, Daejeon (KR); Byeong Guk Choi, Daejeon (KR); Jin Soo Choi, Daejeon (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 16/312,791

(22) PCT Filed: Jul. 17, 2017

(86) PCT No.: PCT/KR2017/007673
§ 371 (c)(1),
(2) Date: Dec. 21, 2018

(87) PCT Pub. No.: WO2018/016831
PCT Pub. Date: Jan. 25, 2018

(65) Prior Publication Data
US 2019/0222068 A1 Jul. 18, 2019

(30) Foreign Application Priority Data

Jul. 18, 2016 (KR) .................. 10-2016-0090698

(51) Int. Cl.
*H02J 50/12* (2016.01)
*H02M 1/08* (2006.01)
(Continued)

(52) U.S. Cl.
CPC .............. *H02J 50/12* (2016.02); *H02M 1/083* (2013.01); *G09G 3/3266* (2013.01);
(Continued)

(58) Field of Classification Search
CPC ...... H04N 5/63; H02M 1/083; H02M 1/4208; G09G 3/3266; G09G 3/3275; G09G 2330/028
See application file for complete search history.

(56) References Cited

U.S. PATENT DOCUMENTS

| 8,294,434 B2 | 10/2012 | Nishida |
| 8,803,365 B2 | 8/2014 | Lee et al. |

(Continued)

FOREIGN PATENT DOCUMENTS

| JP | 2004-72832 A | 3/2004 |
| JP | 2008-148210 A | 6/2008 |

(Continued)

OTHER PUBLICATIONS

Communication dated May 22, 2019, issued by the European Patent Office in counterpart European Application No. 17831304.5.
(Continued)

*Primary Examiner* — Sahlu Okebato
(74) *Attorney, Agent, or Firm* — Sughrue Mion, PLLC

(57) ABSTRACT

The present invention relates to a display apparatus and operational method therefor, and an electronic apparatus,
(Continued)

and the display apparatus according to an embodiment of the present invention may comprise: a resonance circuit unit for generating voltage by means of inductive electromotive force generated due to an external apparatus; a capacitance variance unit for varying the capacitance (Cv) of the resonance circuit unit in order to control the resonance point thereof, the resonance point having been changed due to the distance from the external apparatus; and a display panel for implementing an image by means of the voltage.

16 Claims, 17 Drawing Sheets

(51) Int. Cl.
  *H04N 5/63* (2006.01)
  *H02J 50/90* (2016.01)
  *G09G 3/3266* (2016.01)
  *G09G 3/3275* (2016.01)
  *H02M 1/42* (2007.01)

(52) U.S. Cl.
  CPC ..... *G09G 3/3275* (2013.01); *G09G 2330/028* (2013.01); *H02J 50/90* (2016.02); *H02M 1/4208* (2013.01); *H04N 5/63* (2013.01)

(56) References Cited

U.S. PATENT DOCUMENTS

| | | | |
|---|---|---|---|
| 9,178,389 B2 | 11/2015 | Hwang et al. | |
| 9,295,116 B2 | 3/2016 | Sanders et al. | |
| 9,472,974 B2 | 10/2016 | Shionoiri et al. | |
| 9,912,196 B2 | 3/2018 | Okidan | |
| 10,065,513 B2 | 9/2018 | Plum et al. | |
| 2008/0211800 A1* | 9/2008 | Arasawa | G09G 3/20 345/211 |
| 2011/0234012 A1 | 9/2011 | Yi et al. | |
| 2012/0025627 A1 | 2/2012 | Shionoiri et al. | |
| 2012/0056486 A1 | 3/2012 | Endo et al. | |
| 2013/0221756 A1* | 8/2013 | Singh | H02J 5/005 307/104 |
| 2014/0033147 A1 | 1/2014 | Shao et al. | |
| 2014/0265610 A1 | 9/2014 | Bakker et al. | |
| 2015/0207330 A1 | 7/2015 | Peterson | |
| 2016/0056639 A1 | 2/2016 | Mao | |
| 2016/0056641 A1 | 2/2016 | Hwang et al. | |
| 2016/0221451 A1 | 8/2016 | Plum et al. | |
| 2016/0248275 A1 | 8/2016 | Okidan | |
| 2016/0308397 A1* | 10/2016 | Jung | H02J 50/12 |
| 2017/0040831 A1* | 2/2017 | Desai | H02J 50/12 |

FOREIGN PATENT DOCUMENTS

| | | |
|---|---|---|
| JP | 2009-071951 A | 4/2009 |
| JP | 2011-076515 A | 4/2011 |
| KR | 10-2006-0041334 A | 5/2006 |
| KR | 10-2011-0108596 A | 10/2011 |
| KR | 10-2012-0066281 A | 6/2012 |
| KR | 10-2013-0099015 A | 9/2013 |
| KR | 10-2014-0111881 A | 9/2014 |
| KR | 10-2014-0112780 A | 9/2014 |
| KR | 10-2015-0074801 A | 7/2015 |
| KR | 10-2015-0093588 A | 8/2015 |
| KR | 10-1580342 B1 | 12/2015 |
| WO | 2015/032524 A1 | 3/2015 |
| WO | 2015/087398 A1 | 6/2015 |

OTHER PUBLICATIONS

International Search Report (PCT/ISA/210), issued by International Searching Authority in corresponding International Application No. PCT/KR2017/007673, dated Oct. 20, 2017.
Written Opinion (PCT/ISA/237) issued by the International Searching Authority in corresponding International Application No. PCT/KR2017/007673, dated Oct. 20, 2017.
Communication dated Oct. 15, 2020 issued by the European Patent Office in European Application No. 17 831 304.5.

* cited by examiner (a)

(b)

DISPLAY APPARATUS AND OPERATIONAL METHOD THEREFOR, AND ELECTRONIC APPARATUS

FIELD OF THE INVENTION

Devices and methods consistent with what is disclosed herein relate to a display apparatus, an operational method thereof, an electronic apparatus, and more particularly, to a display apparatus for receiving power regardless of a distance from a peripheral apparatus and maintaining target power constantly such as a DTV, an operational method thereof, and an electronic apparatus.

DESCRIPTION OF THE RELATED ART

Wireless power transfer is a technique for transmitting power wirelessly. The wireless power transfer is referred to as Wi-power similarly to a Wi-Fi technique which enables free Internet access only with a wireless adaptor anytime and anywhere.

The wireless power transfer is categorized by an Inductive Power Transfer System (IPTS) method used for wireless charge, a Coupled Magnetic Resonance System (CMRS) method to be used for an electric vehicle, a high-speed train, etc., and a long distance microwave method using space solar power, which is an ongoing project.

Recently, there is a demand for applying such technique to a display apparatus such as a TV to remove the complexity of wires in terms of interior design.

Such technique may be applied to a TV without change, but considering the characteristic of a TV, a wall-mounted TV can be installed in various manners and in various spaces depending on a user. Therefore, it becomes difficult to transmit stable power.

According to an embodiment of the present disclosure, there provided a display apparatus for receiving power regardless of a distance from a peripheral apparatus and maintaining target power constantly, an operational method thereof, and an electronic apparatus.

SUMMARY

According to an embodiment, there is provided a display apparatus including a resonance circuit unit configured to generate a voltage by using an inductive electromotive force generated by an external apparatus, a capacitance variance unit configured to vary a capacitance (Cv) of the resonance circuit unit to adjust a resonance point of the resonance circuit unit, the resonance point being changed due to a distance from the external apparatus, and a display panel configured to implement an image by using the voltage.

The resonance circuit unit may include a first capacitor connected to one side of a coil unit of which one side terminal generates the inductive electromotive force, and a second capacitor (Cp) connected the other side of the coil unit and the other side terminal of the first capacitor, wherein a capacitance of the second capacitor is variable.

The capacitance variance unit may include a first switching element in which a drain terminal is connected to the other side terminal of the first capacitor, and a first control signal is input to a gate terminal, and a second switching element in which a drain terminal is connected to the other side of the coil unit, a source terminal is connected to the first switching element, and a second control signal is input to a gate terminal.

At least one of a driving frequency of the first switching element and the second switching element or a duty of the first control signal and the second control signal may be determined based on a distance between the external apparatus and the coil unit and whether a resonance circuit is present for forming a current source in the external apparatus.

The duty according to the distance may be determined in a section where the first switching element and the second switching element operate oppositely, and wherein the capacitance varies depending on the determined duty (D).

The first switching element and the second switching element, based on a current flowing in a reverse direction to a diode included in a switching element, or additionally added to an outside within a designated operational range, and a voltage of both ends of a switching element being zero or close to zero, may turn on a switching element in advance and turn off the switching element at a desired time to perform a zero voltage switching (ZVS) operation.

The display apparatus as claimed in claim 4, wherein the capacitance (Cv) is determined by equation $$1 - 2D - \frac{1}{\pi}\sin 2\pi D$$

(where D denotes a duty, and Cp denotes a capacitance of a second capacitor)

The display apparatus may further include a rectifier connected to the resonance circuit unit and the capacitance variance unit and configured to rectify an output voltage of the resonance circuit unit, wherein the rectifier comprises a first diode and a second diode in which anode terminals are respectively connected to drain terminals of the first switching element and the second switching element, and cathode terminals are commonly connected to a load line.

According to an embodiment, there is provided a method for driving a display apparatus including generating a voltage by using an inductive electromotive force generated by an external apparatus, varying a capacitance (Cv) of a resonance circuit unit to adjust a resonance point of the resonance circuit unit, the resonance point being changed due to a distance from the external apparatus, and implementing an image by using the voltage.

The consonance circuit unit may include a first capacitor of which one side terminal is connected to one side of a coil unit which generates the inductive electromotive force, and a second capacitor (Cp) connected to the other side of the coil unit and the other side terminal of the first capacitor, wherein a capacitance of the second capacitor is variable.

The varying of the capacitance may include varying the capacitance by using at least one of a driving frequency of a first switching element and a second switching element in which drain terminals are respectively connected to both terminals of the second capacitor, or a duty of a control signal which controls the first switching element and the second switching element.

At least one of the driving frequency or the duty may be determined based on a distance between the external apparatus and the coil unit and whether a resonance circuit is present forming a current source in the external apparatus.

The duty according to the distance may be determined in a section where the first switching element and the second switching element operate oppositely, and wherein the capacitance varies depending on the determined duty (D).

The method as claimed in claim 11, wherein the capacitance (Cv) is determined by equation:

$$1 - 2D - \frac{1}{\pi}\sin 2\pi D$$

(where D denotes a duty, and Cp denotes a capacitance of a second capacitor).

The method may further include rectifying an output voltage of the resonance circuit unit by a rectifier, wherein the rectifier comprises a first diode and a second diode in which anode terminals are respectively connected to drain terminals of the first switching element and the second switching element, and cathode terminals are commonly connected to a load line.

An electronic apparatus according to an embodiment of the present disclosure may include an inverter configured to an input DV voltage to an AC voltage, a resonance circuit unit configured to generate the AC voltage as a current source, and a coil unit configured to operate in the current source of the resonance circuit unit and generate an inductive electromotive force in a display apparatus.

DETAILED DESCRIPTION OF EXEMPLARY EMBODIMENTS

Hereinafter, embodiments of the present disclosure will be described with reference to drawings.

Figure 1:
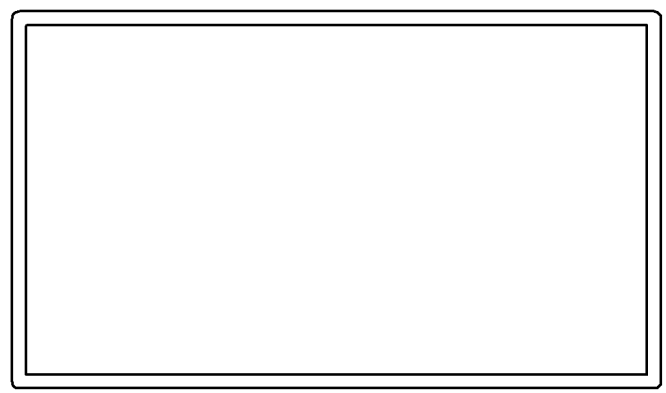
FIG. 1 is a view illustrating an image processing system capable of transmitting and receiving wireless power according to an embodiment of the present disclosure.
Figure 1:
Figure 1:
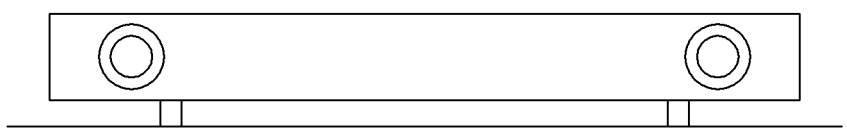

FIG. 1 is a view illustrating an image processing system capable of transmitting and receiving wireless power according to an embodiment of the present disclosure.

Referring to FIG. 1, an image processing system 90 according to an embodiment of the present disclosure may include a sound output apparatus 100 and a display apparatus 110.

The sound output apparatus 100 may include a wireless power transmission apparatus according to an embodiment of the present disclosure. The sound output apparatus 100 may be a peripheral apparatus disposed in the vicinity of the display apparatus 110, and replaced with various apparatuses such as a set-top box (STB), a BD reproducer, an access point (AP), etc. The sound output apparatus 100 may be connected to power plug where a power line provides commercial power (e.g. commercial power ranging from 85V to 265V), and the sound output apparatus 100 may convert the commercial power into a voltage required for the display apparatus 110 and stably transmit the voltage to the display apparatus 110. According to an embodiment of the present disclosure, it is preferable that the display apparatus 100 uses power of DC 200V and 150 W.

The display apparatus 110 may be disposed from the sound output apparatus 100 by a predetermined distance (e.g. within a range between 10 cm and 70 cm) so that power may be efficiently transmitted in a specific space. The sound output apparatus 100 may perform initial driving for transmitting power to the display apparatus 110 according to a distance (d) between two apparatuses. In other words, the sound output apparatus 100 may perform a setting operation process between two apparatuses.

In other words, the sound output apparatus 100 may measure a distance between two apparatuses, and as a result of measurement, if the measured distance is within a predetermined range, i.e. a threshold distance, may perform an operation in connection with the display apparatus 110. However, if the measured distance is too short, voltage gain between the transmission unit and the receiving unit may be reduced by a frequency splitting phenomenon. The sound output apparatus 100 may notify the display apparatus 110 that the voltage gain is reduced, and the display apparatus 110 may adjust a duty ratio of a DC/DC converter which operates in a PWM method to compensate the reduced voltage gain. The detailed description thereof will be made later. If the measured distance is too short, the sound output apparatus 100 may use a Convertible High-Frequency Inverter driving method instead of adjusting a frequency/duty ratio. For example, a half-bridge inverter may be converted into a full-bridge inverter.

However, according to an embodiment of the present disclosure, when the display apparatus 110 performs an operation of varying a capacitance according to a switching operation of a rectifier, the sound output apparatus 100 may not perform an operation based on the measured distance. In addition, an inverter may be operated with a predetermined operating frequency. Therefore, the present disclosure is not limited thereto, but the detailed description will be made later.

The display apparatus 110 may include a wireless power receiving apparatus. The wireless power receiving apparatus may receive power transmitted wirelessly from the wire power transmission apparatus and operate the display apparatus 110. The wireless power receiving apparatus may adjust a duty ratio when PWM control of a DC/DC converter is performed according to a distance from the wireless power transmission apparatus.

As a distance between two apparatuses is reduced, output characteristic may vary due to the increased mutual inductance and the reduced leakage inductance between a first coil unit and a second coil unit, so that desired target power transmission may become impossible. Therefore, the display apparatus 110 may adjust a second capacitor (Cp) value by varying a duty ratio between a first switching element and a second switching element to achieve target power by varying a resistance value of a load resistance (or an effective resistance). When it is determined that the distance between the two apparatuses is too short, and target power cannot be achieved simply by changing the duty, and a converter may be driven using a full-bridge method, not a half-bridge method. As such, if it is determined that control cannot be performed even by using such driving methods, it may be requested to change the operating frequency of the inverter by the sound output apparatus while the display apparatus operates with the specified duty.

In relation to how to adjust the duty, it is possible to simply perform the duty change by sensing the voltage output from the rectifier and comparing the sensed voltage with the pre-stored target voltage. The pre-stores voltage value refers to a predetermined value by an experiment, or the like. Therefore, according to an embodiment of the present disclosure, the above operations are not particularly limited as to what manner of operation is to be performed.

In addition, unless the display apparatus 100 obtains a desired target voltage (or power) by changing the operating frequency of the inverter or changing the effective resistance (Re) of the DC/DC converter, as described above, the display apparatus 100 may obtain a desired target voltage by performing a switching operation. In other words, when the rectifier includes a full-wave rectifying circuit comprising a plurality of diodes, by connecting the plurality of diodes to the switching element and adjusting the capacitance of the capacitor located at the front end of the rectifier, a voltage changed by a resonance point changed according to the distance from the sound output apparatus 100, and a resonance frequency changed according to the change of the resonance point may be compensated. A duty with respect to a control signal of the switching element may vary depending on not only the distance, but also whether the sound output apparatus 100 includes a resonance circuit that changes a voltage source to a current source.

As described above, an image process system 90 according to an embodiment of the present disclosure may stably transmit power regardless of the distance between the wireless power transmission apparatus and the wireless power receiving apparatus.

Figure 2:
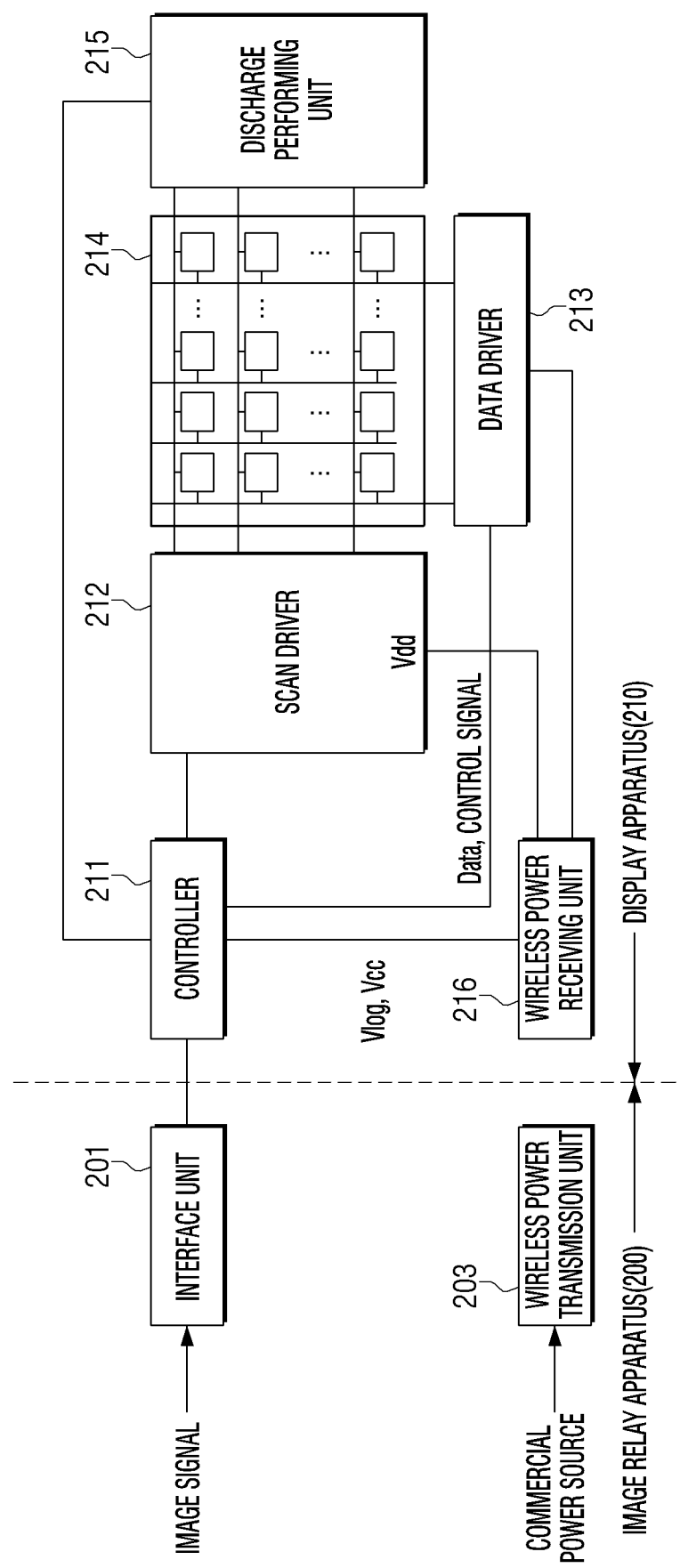
FIG. 2 is a view illustrating an image processing system according to another embodiment of the present disclosure.

FIG. 2 is a view illustrating an image processing system according to another embodiment of the present disclosure.

Referring to FIG. 2, an image processing system 190 according to another embodiment of the present disclosure may include an image relay apparatus 200 and a display apparatus 210.

The image relay apparatus 200 may be a peripheral apparatus such as a set-top box (STB), a Blue-ray (BD) reproducer, or a relay apparatus (e.g. AP). When the image relay apparatus 200 fails to perform an image processing operation, but servers to receive commercial power and transmit the power to the display apparatus 210, the image relay apparatus 200 may be referred to as a power transmission apparatus.

The image relay apparatus 200 may include an interface unit 201 and a wireless power transmission unit 203 as a set-top box.

The interface unit 201 may convert image data input from an outside to correspond to resolution of the display apparatus 210 and output the data as an image board such as a graphic card. The image data may be video data of R, G and B of 8 bits or more, the interface unit 210 may generate control signals such as a clock signal (DCLK), a vertical synchronization signal Vsync, and a horizontal synchronization signal Hsync, which correspond to the resolution of the display apparatus 210. The interface unit 201 may provide the vertical/horizontal synchronization signals and the image data to the controller 211. Data may be wirelessly transmitted from the interface unit 201 to the controller 211, but also may be transmitted in a wired manner, for example, using a USB cable. Therefore, an embodiment of the present disclosure is not limited thereto.

Further, the interface unit 201 may include a tuner for receiving a specific broadcasting program provided by a broadcasting station, a demodulator for demodulating image signals input by the tuner, a demultiplexer for separating the demodulated image signal into video/audio data and additional information, a decoder for decoding the separated video/audio data, an audio processing unit for converting the decoded audio data into a format suitable for a speaker, and a controller (e.g. MCU) for controlling the overall operations thereof.

The wireless power transmission unit 203 may generate a voltage required for the display apparatus 210 by using commercial power within a range from 85V to 265V. In addition, the wireless power transmission unit 203 may transmit the generated voltage to the display 210, more specifically, to the wireless power receiving unit 216 wirelessly. Power transmission means that power of the wireless power transmission unit 203 is generated or changed rather than that actual information is transmitted. For example, it is the same principle that an inductive electromotive force is generated in the second coil when a current flows in the first coil (or an inductor) of a transformer.

The wireless power transmission unit 203 may perform an operation depending on the position where the image relay apparatus 200 and the display apparatus 210 are installed by a user. That is, the wireless power transmission unit 203, if the wireless power transmission unit 203 and the wireless power receiving unit 216 are within a predetermined range, may transmit a first voltage to the wireless power receiving unit 216, and if both are output of the range, may transmit a second voltage. For example, a distance between the wireless power transmission unit 203 and the wireless power receiving unit 216 is small, the first voltage of 400V DC may be transmitted, and if the distance is out of a predetermined value, DC voltage of 200V may be transmitted. In order to easily perform such operation, the wireless power transmission unit 203 may apply a convertible high frequency inverter, and select a full-bridge inverter and a half-bridge inverter for driving. The detailed description thereof will be made below.

The display apparatus 210 may include a controller 211, a scan driver 212, a data driver 213, a display panel 214, a discharge performing unit 215 and a wireless power receiving unit 216.

The expression "including part or all" means that the scan driver 212 and/or the data driver 213 may be combined with (e.g. a COG method) or integrated with (e.g. AMOLED, etc.) the display panel 214, or the discharge performing unit 215 may be omitted to form the display apparatus 210. However, it will be assumed that the display apparatus 210 includes all of the above components to convey full interpretation of the present disclosure.

The controller 211 may generate control signals for controlling the scan driver 212 and the data driver 213 to display image data of RGB input through the interface unit 201 on the display panel 214. The controller 211 may express the grayscale information of R, G, and B data using a logic voltage Vlog provided by the wireless power receiving unit 216. For example, when the grayscale information of R is generated by using a logic voltage of 3.3 V, 8-bit information '10001001' may be generated by expressing 3.3V as 1 and 0V as 0.

The controller 211 may generate a gate shift clock (GSC) signal, a gate output enable (GOE) signal, and a gate start pulse (GSP) signal as gate control signals for controlling the scan driver 212. The GSC signal may be a signal for determining a time when a switching element connected to a light emitting element such as R, G, and B LED (or OLED) is turned on/off, the GOE signal may be a signal for controlling the output of the scan driver 212, and the GSP signal may be a signal that indicates the first driving line of a screen from one vertical synchronization signal.

The controller 211 may also generate a source sampling clock (SSC) signal, a source output enable (SOE) signal, and a source start pulse (SSP) signal as a data control signal. The SSC signal may be used as a sampling clock for latching data in the data driver 230, and the SOE signal may transfer the data latched by the SSC to the display panel 214. The SSP signal may be a signal for notifying the start of data latching or sampling during one horizontal synchronization period.

More specifically, if the data driver 213 is formed of an IC of the Texas Instruments TCL 5958 series, for example, the controller 211 according to an embodiment of the present disclosure may process data signals, serial data shift clock (S CLK), LAT, and grayscale (GS) pulse width modulation (PWM) reference clock (G CLK) with the IC. The data signal may be grayscale data of R, G, and B. The S CLK signal may be a signal for shifting data input to the data driver 213 to a shift register (e.g. 48-bit common shift register (MSB)) in synchronization with the rising edge of the S CLK.

The data stored in the shift register may be shifted from each S CLK rising edge to the MSB. The LAT may be a signal for latching data at the falling edge from the MSB to a memory (ex. GS data memory). The G CLK may be a signal for increasing the GS counter by one on each rising edge of G CLK for PWM control. The various signals described above can be changed, so that an embodiment of the present disclosure is not particularly limited to the above.

The controller 211 may include a control signal generation unit (not shown) and a data rearrangement unit (not shown). The control signal generation unit, if a time for displaying an image in a unit frame on the display panel 214 is 16.7 ms, may generate a control signal to display a unit frame image within a predetermined time. In addition, the data rearrangement unit may reproduce the input RGB image data to be suitable for the display panel 214. For example, the controller 211 may convert 8 bit data into 64 bit data.

The scan driver 212 may receive a gate-on voltage (Vdd) and a gate-off voltage (Vss) provided by the wireless power receiving unit 216 and apply the voltage to the display panel 214 under the control of the controller 211. However, according to an embodiment of the present disclosure, the gate-on voltage (Vdd) may be provided from a second line 1 (GL1) to a scan line N (GLn) sequentially to embody a unit frame image on the display panel 214. The scan driver 212 may operate in response to the scan signal generated by the controller 211 according to an embodiment of the present disclosure. The scan driver 212 may include a power voltage source and a switching element connected to each scan line as shown in FIG. 2. The switching element may use not only a TFT element, but also a transistor (TR) and MOSFET.

The data driver 213 may convert video data of R, G and B provided serially by the controller 211 into video data in parallel, convert digital data into an analogue current or a duty-on current (e.g. a pulse current), and provide video data corresponding to a single horizontal line on the display panel 214 for each horizontal line simultaneously and sequentially. Digital information of video data provided by the controller 211 may be converted into an analogue current including a color grayscale and the analogue current may be provided to the display panel 214. The analog current may be a pulse type current. It is preferable that the data driver 213 may also be synchronized with a gate signal provided to the scan driver 212 and output unit frame data.

In the following description, the configuration which is publicly known but irrelevant to the gist of the present disclosure would be omitted.

Since the detailed configuration of the data driver 213 is well known to those skilled in the art and irrelevant to the gist of the present disclosure, it would be omitted. In other words, the data driver 213 may be variably configured depending on whether a light emitting element is driven with a constant current, or with a constant voltage. The Texas Instruments TLC5958 Series IC may be used for the data driver 213.

The display panel 214 may include a plurality of scan lines and a plurality of data lines intersecting with each other to define a pixel area, and light emitting elements of R,G and B such as LED (or OLED) may be provided in the pixel area where the scan lines and the data lines cross each other. When a power voltage is applied to each scan line of the display panel 214, and a current path is formed between grounds through the data driver 213, light emitting elements may generate a current corresponding to their grayscale information through the data lines connected to the scan lines to which a power voltage is supplied.

The display panel 214 may display an image by adjusting brightness depending on the amount of charge flowing through a current path. The light emitting element may be driven by a constant voltage. Therefore, an embodiment of the present disclosure is not limited thereto.

The discharge performing unit 215 may discharge parasitic charge by a parasitic capacitor of each scan line to a ground when each scan line discharges. The discharge performing unit 215 may be controlled by the controller 211. The discharge performing unit 215 may be controlled between when the power voltage Vdd provided to a scan line 1 is blocked, and when a power voltage is provided to a scan line 2.

The wireless power receiving unit 216 may include a switching rectifier which switches a rectifier. The wireless power receiving unit 216 may control a switching element of a switching rectifier, perform the ZVS operation, and adjust a capacitance of a capacitor which is disposed at a front end of the switching rectifier and connected to the front end in parallel. The variance of the capacitance may allow a desired voltage to be output through the rectifier by adjusting a resonance frequency distorted depending on the distance between the wireless power receiving unit 216 and the wireless power transmission unit 203.

The wireless power receiving unit 216 may generate a first voltage (e.g. DC 200V) and a second voltage (e.g. DC 13V) through a converter and provide the generated voltage to each functional block (e.g. a display panel, a driver, etc.). The wireless power receiving unit 216 may generate a voltage of DC 3.3V as a logic voltage to present a grayscale, and generate various magnitudes of voltages such as a voltage of DC 4.5V as a gate-on voltage Vdd for the scan driver 220.

The wireless power receiving unit 216 may generate a VCC voltage (e.g. DC13V), which is input to an IC, when the controller 211, the scan driver 212, and the data driver 213 are integrated in IC form.

Figure 3:
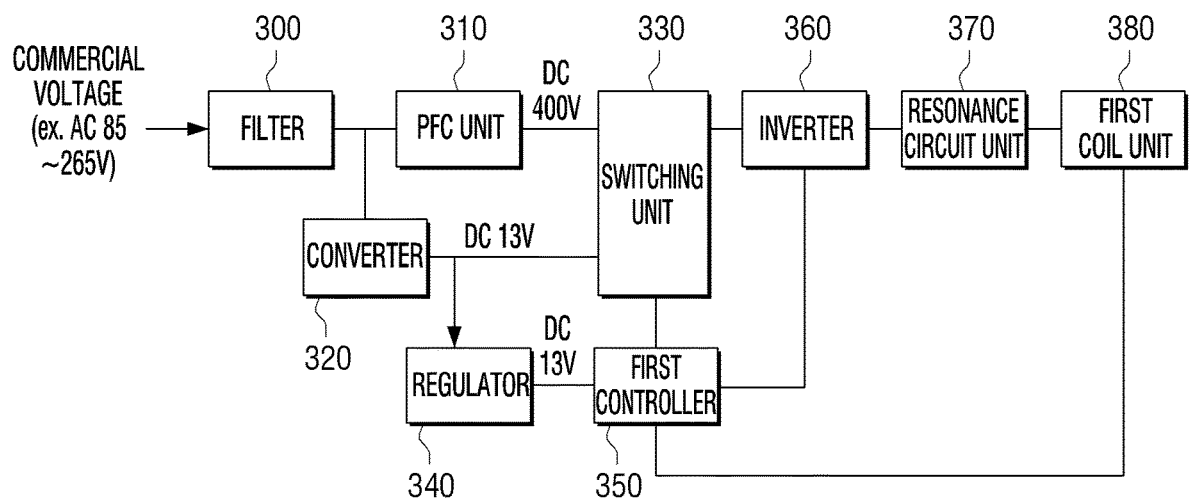
FIG. 3 is a block diagram showing a detailed structure of a wireless power transmission unit shown in FIG. 2.

FIG. 3 is a block diagram showing a detailed structure of a wireless power transmission unit shown in FIG. 2.

Referring to FIG. 3, a wireless power transmission unit 203 may include part or all of a filter 300, a PFC unit 310, a converter 320, a switching unit 330, a regulator 340, a controller 350, an inverter 360, a resonance circuit unit 370, and a first coil unit 380.

The wireless power transmission unit 203 may be a stand-alone type individual apparatus, and the expression "include part or all" means that some constituent elements such as the converter 320, the switching unit 330, the regulator 340, and the resonance circuit unit 370 are omitted. However, it will be assumed that the wireless power transmission unit 203 includes all of the above components to convey full interpretation of the present disclosure.

The filter 300 may rectify or smooth the input commercial power and output a DC voltage at a constant level. A half-wave or full-wave rectifier circuit may be used for rectification, and a capacitor may be connected to an output end of the rectifier circuit in parallel for smoothing.

The PFC unit 310 may change the voltage output from the filter 330 to a voltage of 400V through a converter to output. The PFC unit 310 may include a fly-back converter.

The converter 320 may be provided with a smoothing voltage output from the filter 330, generate a DC voltage of 13V, and provide the DC voltage to the switching unit 330 and the regulator 340.

The switching unit 330 may output a first voltage of DC 13V and a second voltage of DC 400V, which is selected under the control of the first controller 350.

The regulator 340 may perform an operation for proving a stable voltage to the first controller 350. The regulator 340 may allow the ripple to be improved in the output voltage.

When the image relay apparatus 220 and the display apparatus 210 of FIG. 2 are initially installed and driven, the controller 350 may measure a distance between the image relay apparatus 220 and the display apparatus 210 automatically or by a command of a system designer or a user, more specifically, a distance between the wireless power transmission unit 203 and the wireless power receiving unit 216 of FIG. 2.

The first controller 350 may control the switching unit 330 and output a voltage of DC 13V to the inverter 360. The voltage of DC 13V may be a voltage for measuring a distance. The first controller 350 may sense a current of the inverter 360 and measure a distance between two apparatuses. For example, the first controller 350 may determine whether a current value of the sensed current coincides with the stored current value, and then determine an operating frequency and a distance.

The first controller 350 may perform a down-scanning operation or an up-scanning operation for measuring a distance. The down-scanning may operate the wireless power transmission apparatus 203 at a maximum frequency within the given range and gradually reduce the frequency, determine the frequency at the time of sensing a current, and then determine the distance.

The first controller 350 may store distance information which is matched with the frequency, and determine a distance based thereon. The first controller 350 may measure a distance using the up-scanning method. That is, a point where the current value is maximum may be found by sequentially increasing the operating frequency within the range. A distance may be determined based on the determined maximum current value. Since the distance information is matched with the maximum current value, the distance may be determined by retrieving the distance information.

When the frequency scanning operation for measuring a distance is completed, the first controller 350 may control the switching unit 330 so that the voltage of DC 400V may be output to the inverter 360. As a result, a wireless power operation may start.

The inverter 360 may convert the input voltage of DC 400V into AC voltage and output the AC voltage. For example, the inverter 360 may include a PWM circuit to allow the first controller 350 to perform PWM control. The first controller 350 may adjust an operating frequency and duty-on time by controlling the inverter 360, and when distance measurement is completed, the first controller 350 may operate using the determined operating frequency and duty ratio as a fixed value. The PWM circuit is well known in the related art, and thus the detailed description thereof will be omitted. However, the inverter 360 may include a convertible high frequency inverter. The inverter 360 may include a push-pull type inverter if high frequency AC magnetic field is generated according to an embodiment of the present disclosure.

The inverter 360 may drive a full-bridge type inverter or a half-bridge type inverter depending on the distance. The full-bridge type inverter may further include a switching element compared to the half-bridge type inverter. Therefore, according to an embodiment, the inverter 360 may be conveniently driven using the half-bridge method by driving switching elements corresponding to one pole in the full-bridge method.

The resonance circuit unit 370 may be configured to generate a current source, but can be omitted depending on an embodiment. In addition, the resonance circuit unit 370 may include an LC parallel resonance circuit for generating a current source, but if the current source is generated, various circuits other than the LC parallel resonance circuit may be provided.

A Zero Voltage Switching (ZVC) unit may be provided on the output end of the resonance circuit unit 370. The ZVS unit may include a ZVC element (filter). Such the ZVC unit may operate when a distance between the wireless power transmission unit 203 and the wireless power receiving unit 216 is small. As the distance between the wireless power transmission unit 203 and the wireless power receiving unit 216 is reduced, gain for power transmission may be reduced. As a result, the display apparatus 210 may not obtain the desired power. The zero voltage may generate when a distance (e.g. 30 cm) becomes too short, and the coil of the first coil unit 380 may be affected by the coil of the second coil unit 400, so that mutual inductance may increase, and a current may fail to flow through the first coil. As a result, power may not be properly transmitted. The ZVS unit may constantly maintain the efficiency of power transmission by allowing a current to flow through the ZVS element.

The first coil unit 380 may include a coil, that is, an inductor, and when the ZVC unit 370 fails to operate, a current may flow through the first coil, so that the inductive electromotive force may be generated in the wireless power receiving unit 216.

Figure 5:
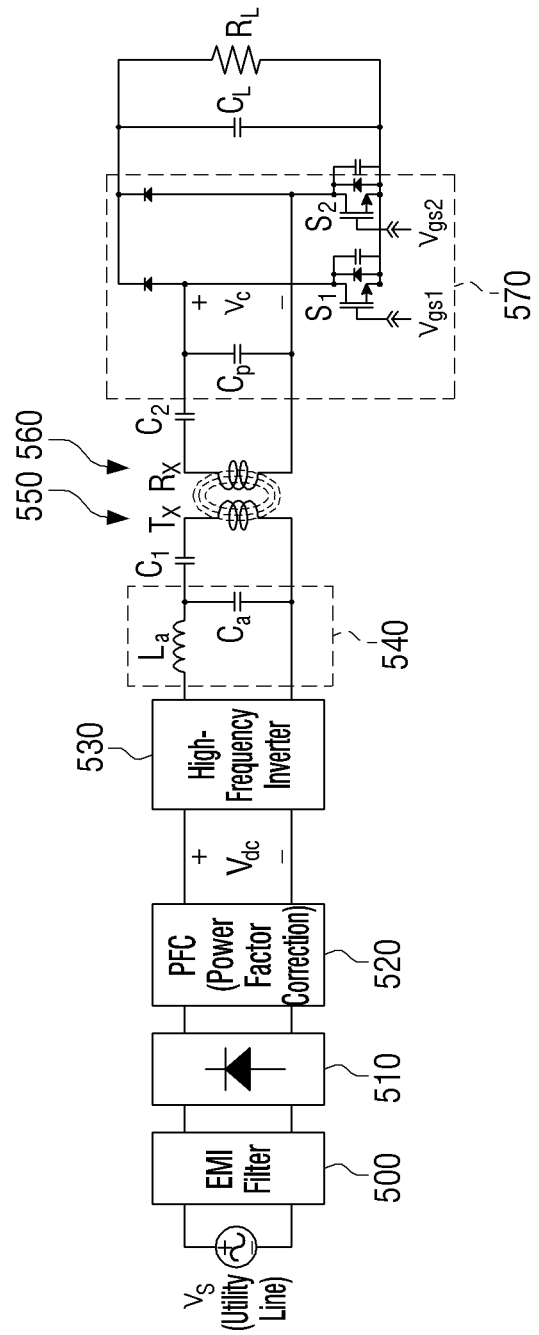
FIG. 5 is a view illustrating output power and efficiency characteristic according to a distance change of voltage source input inductive power transfer system, (IPTS)

However, according to an embodiment of the present disclosure, the wireless power transmission unit 203 may have the same structure as that shown in FIG. 5. The detailed description will be made with reference to FIG. 5.

Referring to FIG. 3, by determining an operating frequency in the wireless power transmission unit 203 through a frequency scanning operation and driving an inverter with the determined operating frequency in order to measure the distance between the wireless power transmission unit 203 and the wireless power receiving unit 216, the wireless power receiving unit 216 may constantly maintain target power. The resonance circuit unit 370 may be omitted, and the ZVS circuit may be provided instead.

Figure 4:
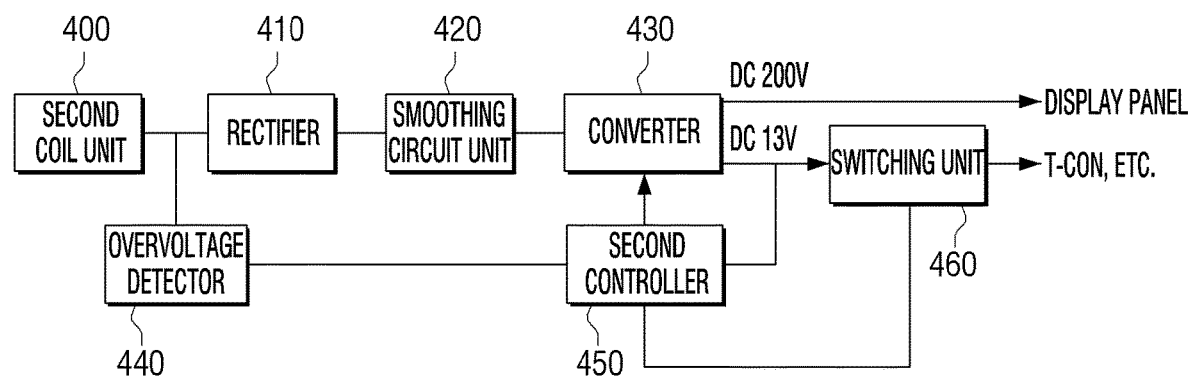
FIG. 4 is a block diagram showing a detailed structure of a wireless power transmission unit shown in FIG. 2.

FIG. 4 is a block diagram showing a detailed structure of a wireless power transmission unit shown in FIG. 2.

Referring to FIG. 4, the wireless power receiving unit 216 according to an embodiment of the present disclosure may include some or all of a second coil unit 400, a rectifier 410, a smoothing circuit 420, a converter 430, an overvoltage detector 440, a second controller 450 and a switching unit 460.

The expression "include part or all" means that some constituent elements such as the converter 430, the overvoltage detector 440 and/or the switching unit 460 are omitted or some constituent elements are integrated with other constituent elements. However, it will be assumed that the wireless power receiving unit 216 includes all of the above components to convey full interpretation of the present disclosure.

The second coil unit 400 may include a coil, that is, an inductor, and the inductive electromotive force may be generated by a voltage applied to the first coil unit 380 and a current which flows through the first coil. Such inductive electromotive force may have a unit of voltage.

The rectifier 410 and the smoothing circuit 420 may rectify and smooth the AC voltage provided by the second coil unit 400 and convert the AC voltage into the DC voltage.

The converter 430 may include a DC-DC converter, and generate and output voltages of DC 200V and DC 13V. The voltage of DC 200V may be provided to drive an LED string provided in the display panel 214. The voltage of DC 13V may be used as a VCC power source of the controller 211, or the scan driver 212 and the data driver 213. PWM control may be performed on the DC-DC converter constituting the converter 430, and the duty ratio may be adjusted according to the distance. According to an embodiment, the converter 430 may operate in three manners. In other words, when the operating frequency of the inverter 360 is determined based on the distance, the wireless power transmission unit 203 may operate with a predetermined duty without additional duty adjustment. If the operating frequency of the inverter 360 is constant regardless of the distance, the converter 430 may operate by adjusting the duty according to the distance. The converter 430 may measure the distance by sensing the current output from the converter 430 and comparing the output current with a predetermined value, and adjust the duty by using pre-stored duty information, which is matched with the measured distance. Further, when the distance is too short, it is possible to adjust the duty with changing the operating frequency of the inverter.

The overvoltage detector 440 may detect the overvoltage applied from the second coil unit 440 to the rectifier 410 and transmit the overvoltage to the second controller 450. The second controller 450 may temporarily block the voltage applied to the rectifier 410.

The second controller 450 may control the converter 430 upon the request of the wireless power transmission unit 203. For example, if the converter unit 430 needs to adjust (input) the duty and control the effective resistance, the second controller 450 may adjust the duty ratio and control the converter 430 with the adjusted duty.

The second controller 450 may maintain the switching unit 460 to be turned off so that the voltage of DC 13V may not be output during the initial driving, or the scanning operation for measuring the distance after the image replay apparatus 200 and the display apparatus 210 are installed. When it is determined that the scanning operation is completed by sensing the current output from the converter 430. The switching unit 460 may be turned on and the voltage of DC 13V may be output.

As a result, the wireless power receiving unit 216 may generate a stable voltage required by the display apparatus 210. The stable voltage may affect the image quality of the display panel 214.

Figure 6:
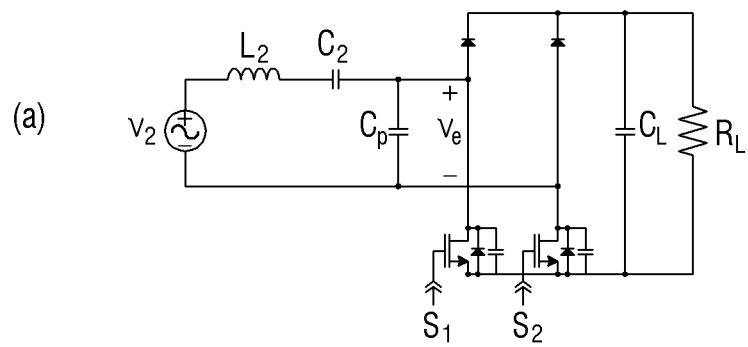
FIG. 6 is an equivalent circuit diagram of the IPTS under initial condition before load operation (RL=∞)
Figure 6:
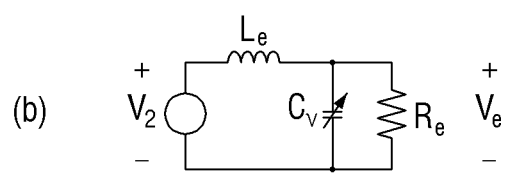
Figure 7:
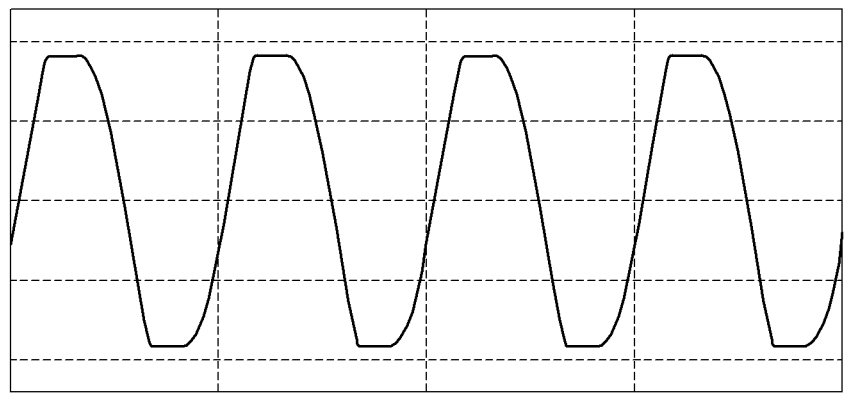
FIG. 7 is a view illustrating an example of frequency scanning for identifying a distance between a transmission unit and a receiving unit during initial operation.
Figure 7:
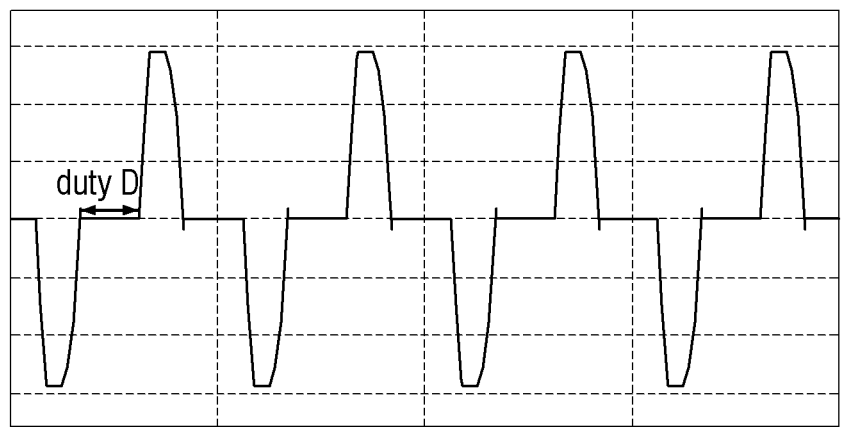

FIG. 5 is an entire IPTS circuit diagram illustrating that a variable switching capacitor (or a switching rectifier) is applied to a receiving end, FIG. 6 is a variable switching capacitor application circuit diagram and an equivalent circuit diagram, and FIG. 7 is a view illustrating Ve waveform before and after applying a variable switching capacitor.

Referring to FIG. 5, the wireless power transmission unit 203 of FIG. 2 according to another embodiment of the present disclosure may include some or all of a filter 500, a rectifier 510, a PFC unit 520, an inverter 530, a resonance circuit unit 540, and a first coil unit 550. The wireless power receiving unit 216 may include a second coil unit 560, and a switching rectifier 570.

The switching rectifier 570 may include a high frequency operation switch (or a capacitor variance unit) at the bottom of the rectifier to generate an effective capacitance (Cv) by adjusting the switching duty (ratio). The term "effective capacitance" refers to a capacitance (Cp) (or the second capacitor) connected to the front end of the switching rectifier 570 in parallel. The adjustment of the effective capacitance refers to adjusting the resonance frequency of the output end resonance circuit of the second coil unit 560, which is distorted according to the distance between the wireless power transmission unit 203 and the wireless power receiving unit 216. As a result, constant power control may become possible.

The wireless power transmission unit 203 may include the resonance circuit unit 540 to change the voltage source to the current source, and allow a constant current to flow through the first coil unit 550. Accordingly, the wireless power receiving unit 216 may control the operation of the switching rectifier 570 only considering the effective capacitance according to the change in inductance of the second coil unit 56. The switching element may generate the effective capacitance by changing the switching duty and/or the switching frequency.

Referring to FIG. 5, a resonance capacitor ($C_1$) may be connected between the resonance circuit unit 540 and the first coil unit 550 in the IPTS, and a resonance capacitor ($C_2$) (or a first capacitor) may be connected between the second coil unit 560 and the switching rectifier 570 in the wireless power receiving unit 216.

The resonance capacitors $C_1$ and $C_2$ may be series resonance capacitors, but an embodiment of the present disclosure is not limited thereto. The resonance capacitors may be connected either in series or in parallel.

In addition, referring to FIG. 5, the LC parallel resonance filter may be applied to generate the current source, but the present disclosure is not limited thereto. Various types of circuits may be applied.

To be more specific, the switching rectifier 370 may consist of a rectifier and a switching unit (or a capacitor variance unit). The switching unit may include first and second switching elements, drain terminals of the first and second switching elements may be respectively connected to both ends (terminals) of the capacitor (Cp), and the drain elements may be respectively connected to anode terminals of first and second diodes. The source terminals of the first and second switching elements may be commonly connected to a loading end. The cathode terminals of the first and second diodes may be connected to the loading end. The first and second control signals may be input to the gate terminals of the first and second switching elements.

Referring to FIGS. 5 to 7, a variable switching capacitor operation principle will be described.

Referring to FIG. 5, by connecting a high frequency operational switch to a bottom end of the AC-DC rectifier connected to the resonance capacitor and varying the switching duty (D), it is possible to adjust the effective capacitance (Cv) (refer to FIGS. 6 and 7).

The switching duty may range from 0 to 0.5, and the effective capacitance (Cv) may be expressed as Equation 1 below.

$$C_v = \frac{C_p}{1 - 2D - \frac{1}{\pi}\sin 2\pi D} \qquad \text{[Equation 1]}$$

The input-output voltage gain may be obtained as in <Equation 2> below by using a variable switching capacitor in <Equation 1>, and output control may be possible through the variance of the effective capacitance (Cv) (or duty variance).

$$G_V \equiv \left|\frac{V_o}{V_s}\right| = \frac{R_e}{\sqrt{R_e^2(1-\omega_s^2 L_e C_v)^2 + \omega_s^2 L_e^2}} = G_V(C_v) \qquad \text{[Equation 2]}$$

To be more specific, as shown in FIG. 5, a wireless power transmission system to which a variable switching capacitor is applied when an LD resonance filter is applied will be described below.

Figure 8:
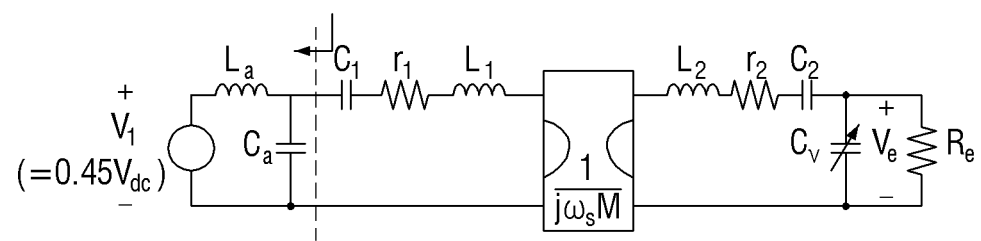
FIG. 8 is a VSC IPTS equivalent circuit diagram to which a Zyreiter model is applied.
Figure 9:
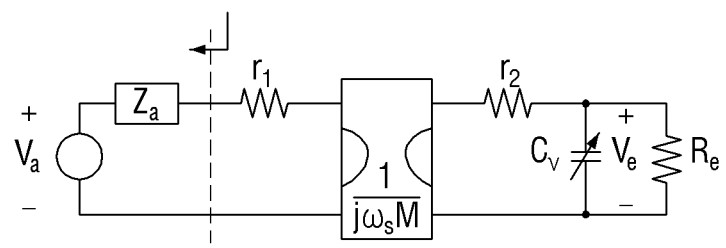
FIG. 9 is an equivalent circuit diagram to which a Tebninc Circuit where L1 and C1, and L2 and C2 are completely resonant is applied.
Figure 10:
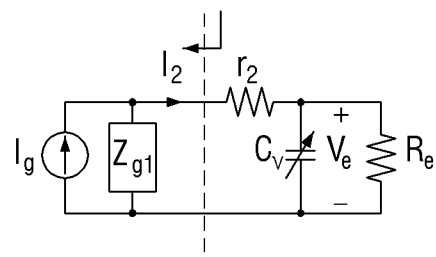
FIG. 10 is an equivalent circuit diagram to which a Zyreiter model is applied.
Figure 11:
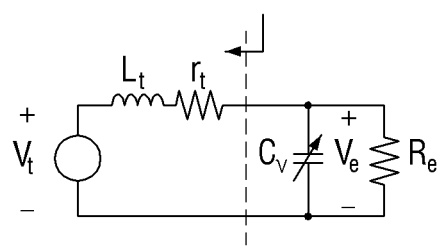
FIG. 11 is a final equivalent circuit diagram according to an embodiment of the present disclosure.

FIG. 8 is a VSC IPTS equivalent circuit diagram to which a Zyreiter model is applied, FIG. 9 is an equivalent circuit diagram to which a Tebninc Circuit where L1 and C1, and L2 and C2 are completely resonant is applied, FIG. 10 is an equivalent circuit diagram to which a Zyreiter model is applied, and FIG. 11 is a final equivalent circuit diagram according to an embodiment of the present disclosure.

The final equivalent circuit of the IPTS when L1 and C1, and L2, and C2 are completely resonant (or partially resonant) is an RLC parallel resonance circuit as shown in FIG. 11.

When the effective capacitance (Cv) is electronically variable, the output power of the receiving end may be controlled. Even if the parallel resonance filter of La and Ca is applied or not applied, the resonance condition of the transmitting and receiving end may be appropriately designed to be an equivalent circuit as shown in FIG. 11.

Referring to FIG. 8, equation is defined by $$P_L \equiv \frac{V_L^2}{R_L} \cong \frac{V_e^2}{R_e},$$

$R_e = \alpha^2 R_L$, referring to FIG. 9, equation is defined by $$V_a = \frac{V_1}{X_a}, Z_a = \frac{j\omega_s L_a}{X_a},$$

$X_m \equiv \omega_s M$ and $X_a \equiv 1 - \omega_s^2 L_a C_a$, and referring to FIG. 10, equation is defined by $$I_g = \frac{V_a}{jX_m}, Z_{g1} = \frac{X_m^2 X_a}{r_1 X_a + j\omega_s L_a}.$$

Therefore, as shown in FIG. 11, the final equivalent circuit in the present disclosure is expressed by <Equation 3> to <Equation 6>.

$$V_e = \frac{R_e V_t}{R_e(1 - \omega_s^2 L_t C_v) + r_t + j\omega_s(L_t + r_t C_v R_e)} \qquad \text{[Equation 3]}$$

$$L_t = \frac{-L_a X_m^2 X_a}{r_1^2 X_a^2 + \omega_s^2 L_a^2} \qquad \text{[Equation 4]}$$

Xa is designed to be negative in order for the above-mentioned effective inductance Lt to be a positive value.

$$r_t = \frac{r_1 X_m^2 X_a}{r_1^2 X_a^2 + \omega_s^2 L_a^2} + r_2 \ (X_a < 0) \qquad \text{[Equation 5]}$$

$$P_L = |P_L| = |P_e| = \frac{R_e |V_t|^2}{\{R_e(1 - \omega_s^2 L_t C_v) + r_t\}^2 + \omega_s^2 (L_t + r_t C_v R_e)^2} \qquad \text{[Equation 6]}$$

Figure 12:
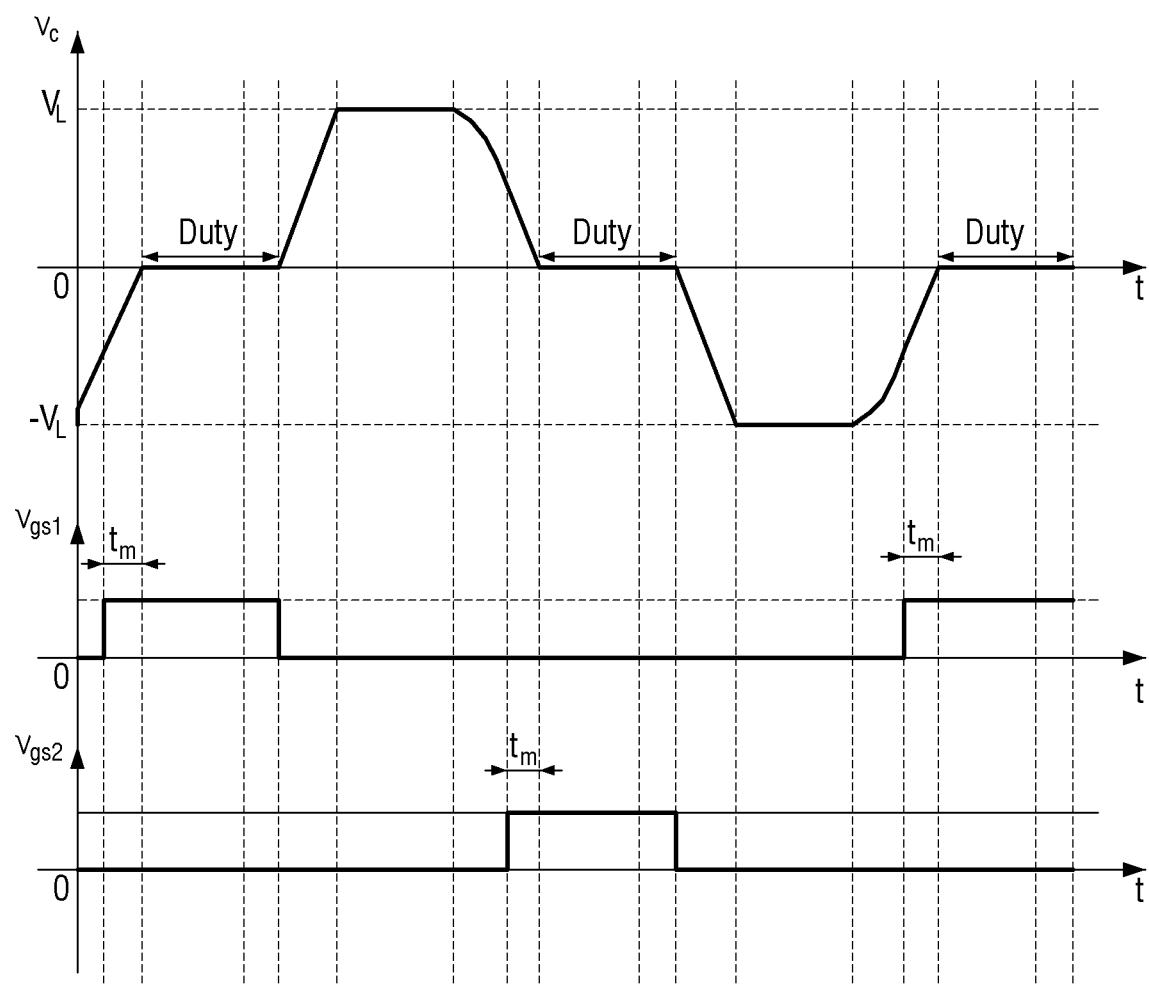
FIG. 12 is an exemplary view of a wavelength for a ZVS operation of a high frequency operation switch.

FIG. 12 is an exemplary view of a wavelength for a ZVS operation of a high frequency operation switch.

Referring to FIG. 12, in relation to the soft switching of the high-frequency operational switches $S_1$ and $S_2$, a switch may be turned on before the operational range for Zero Voltage Switching (ZVS) of the high-frequency operational switches $S_1$ and $S_2$ embodied in the convertible switching capacitor and a turn-on state of the switch may be maintained for a predetermined period of time (tm) and then the switch may be turned off.

As a result, it is possible to finally operate with an effective duty as much as duty.

Figure 13:
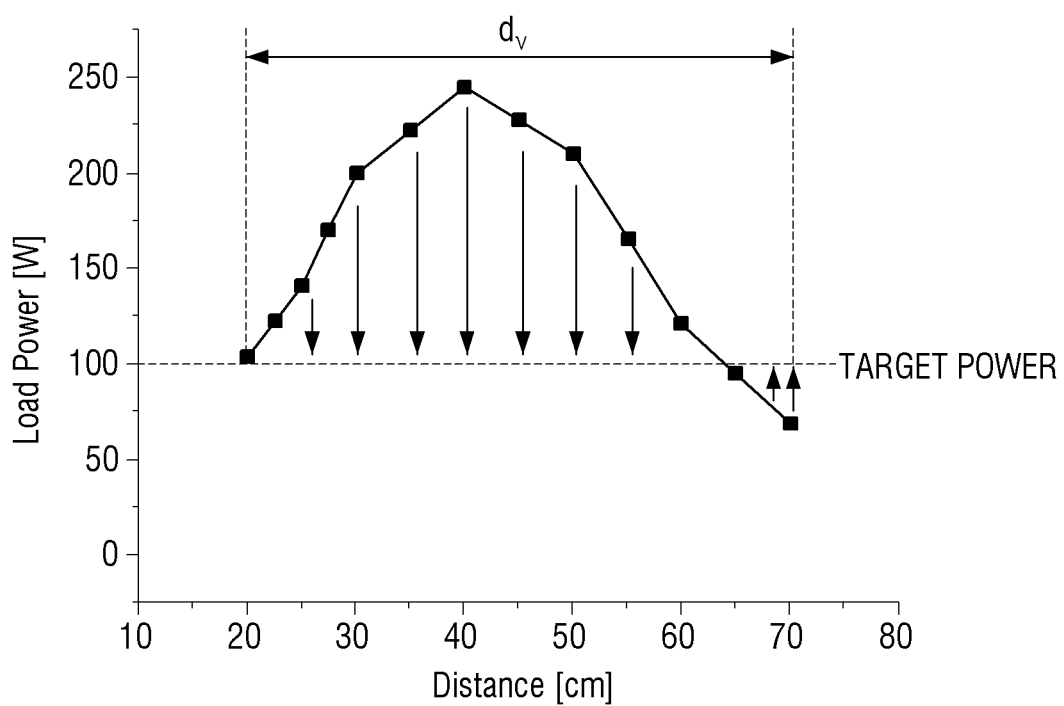
FIG. 13 is a view illustrating an example of an output power characteristic when a variable switching capacitor is not applied during distance change.
Figure 14:
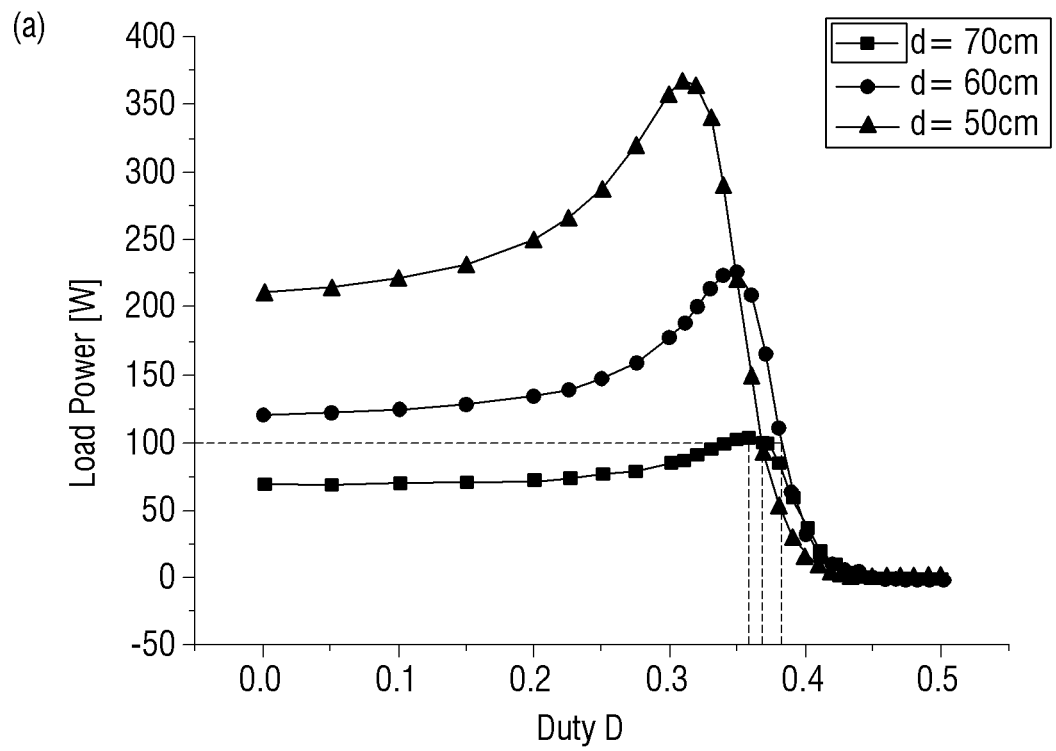
FIG. 14 is a view illustrating an example of an output characteristic according to a duty change of a variable switching capacitor by distance.
Figure 14:
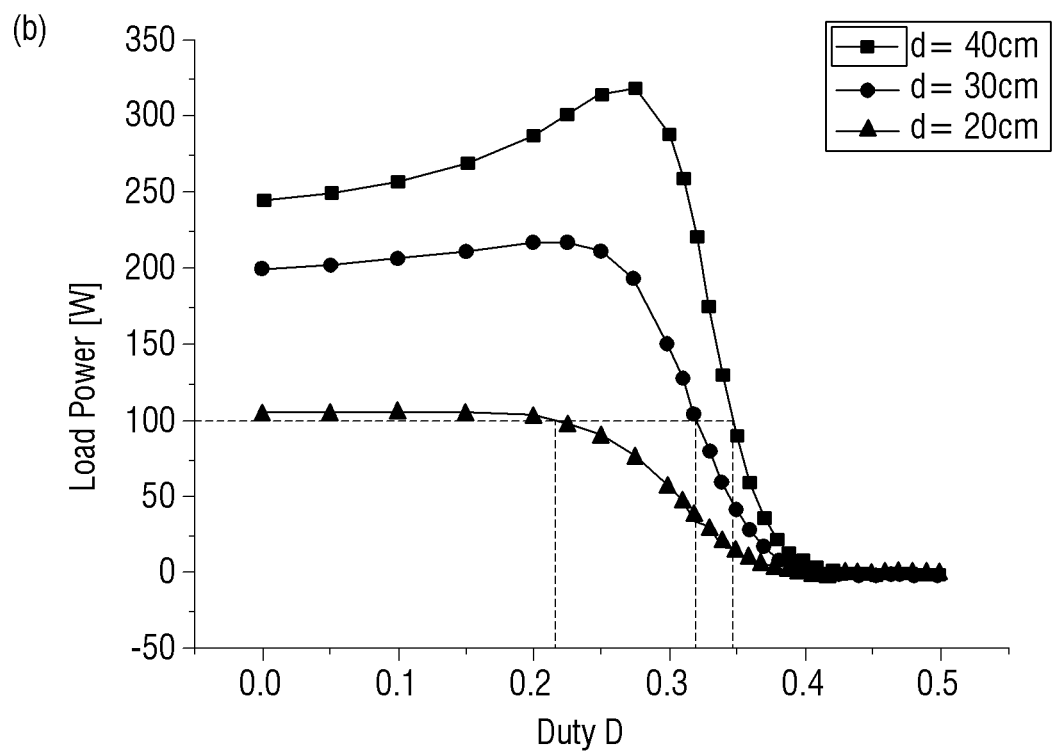
Figure 15:
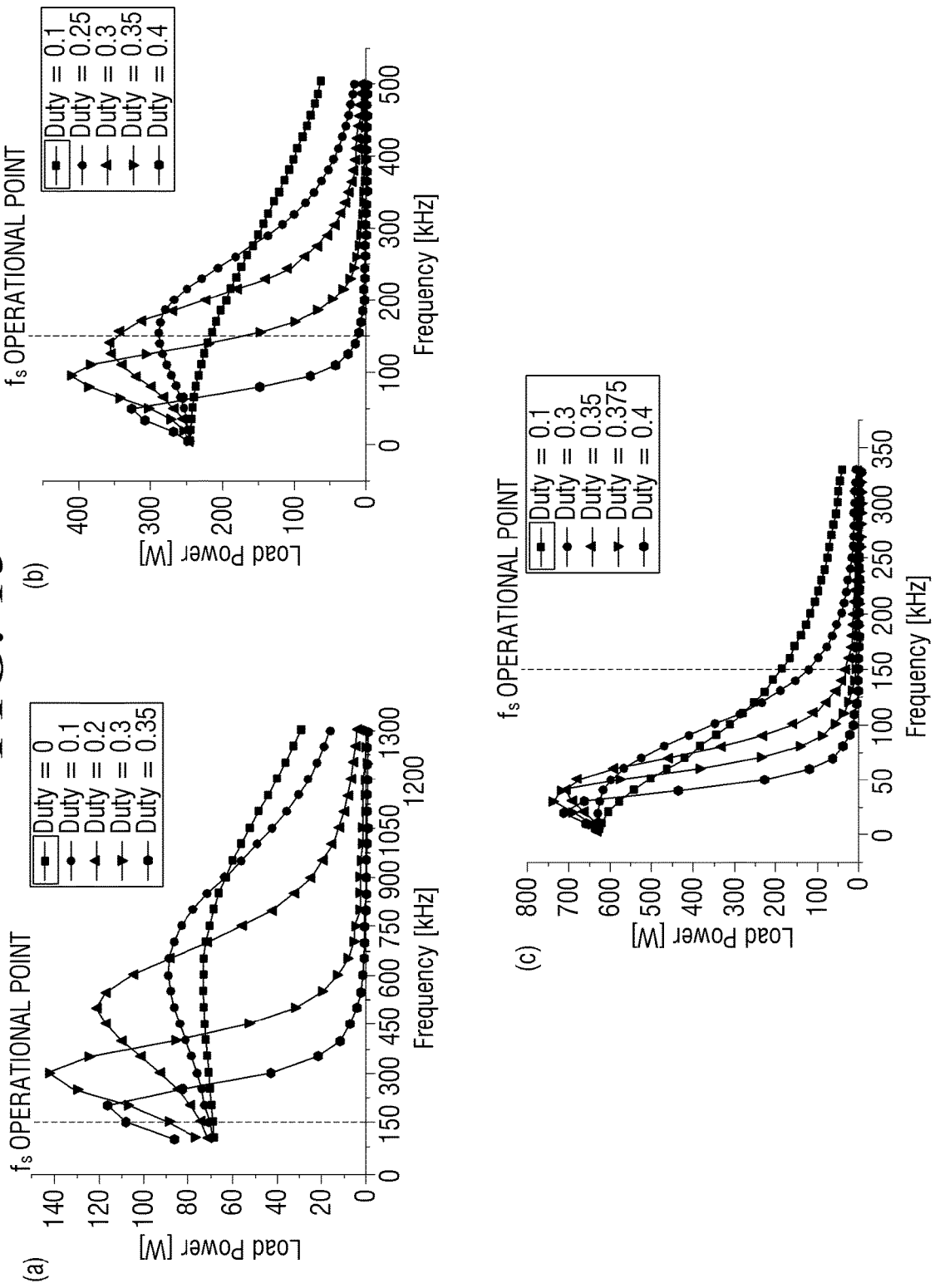
FIG. 15 is a view illustrating an example of an output characteristic according to a variation of an operating frequency by duty of VSC.

FIG. 13 is a view illustrating an example of an output power characteristic when a variable switching capacitor is not applied during distance change, FIG. 14 is a view illustrating an example of an output characteristic according to a duty change of a variable switching capacitor by distance, and FIG. 15 is a view illustrating an example of an output characteristic according to a variation of an operating frequency by duty of VSC.

Referring to FIGS. 13 to 15, in relation to the constant power output control characteristic at the time of the distance change between the wireless power transmission unit 203 and the wireless power receiving unit 216 over the wide range, as in an embodiment of the present disclosure, it is possible to control constant power output with target power (e.g. 100 W) at the time of distance change between the wireless power transmission unit 203 and the wireless power receiving unit 216 by applying a convertible switch capacitor method.

In addition, the output characteristic is significantly different according to the duty change and the switching operating frequency as shown in FIGS. 14 and 15.

Figure 16:
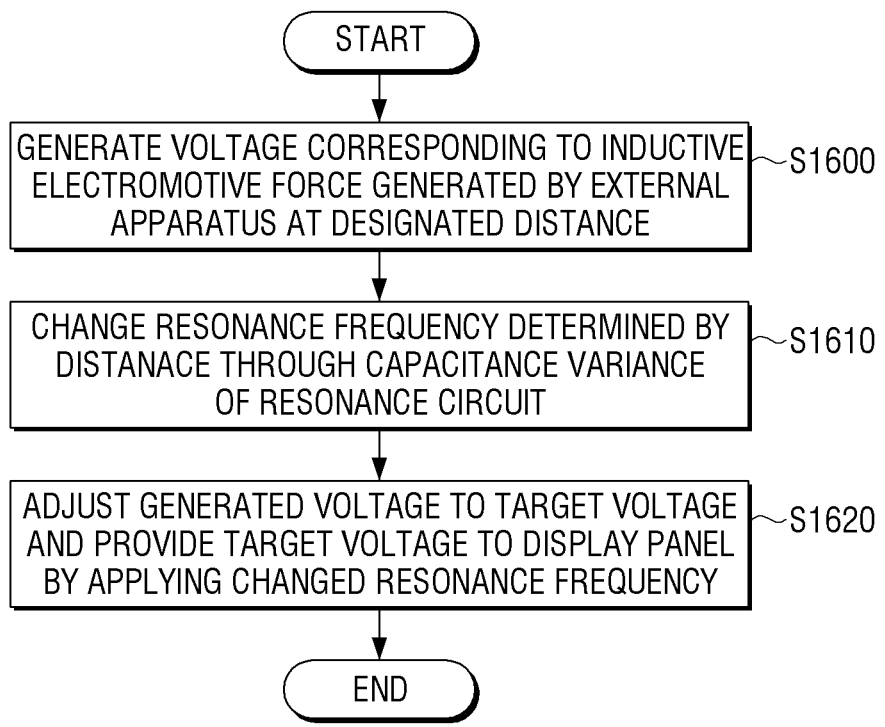
FIG. 16 is a flowchart to explain a driving process of a display apparatus according to an embodiment of the present disclosure.

FIG. 16 is a flowchart to explain a driving process of a display apparatus according to an embodiment of the present disclosure.

Referring to FIG. 16 together with FIG. 2 for ease of explanation, the display apparatus 210 according to an embodiment of the present disclosure may wirelessly receive a voltage from an external apparatus, for example, the image relay apparatus 200 at step S1600. The expression "receive a voltage" means generating a voltage corresponding to the inductive electromotive force which is generated by the external apparatus disposed at a designated distance.

In addition, the display apparatus 210 may adjust the resonance frequency of the resonance circuit determined depending on the distance from the external apparatus through the capacitance variance of the resonance circuit at step S1610. In other words, the resonance point of the resonance circuit may be changed by the distance, and it means the resonance frequency change. Therefore, it is necessary to adjust the changed resonance frequency to a predetermined value to generate target power. Therefore, according to an embodiment of the present disclosure, the capacitance of the resonance circuit may vary. The variable capacitance may be referred to as the effective capacitance (Cv) according to an embodiment of the present disclosure.

The display apparatus 210 may adjust the received voltage to a target voltage, by the adjusted resonance frequency, and output the target voltage to a display panel at step S1620. In other words, if the resonance frequency is changed by the distance, it can be considered that output power with respect to input power fails to satisfy a predetermined condition. According to an embodiment of the present disclosure, target power, for example, a voltage may be obtained by returning the predetermined condition to its original one.

Figure 17:
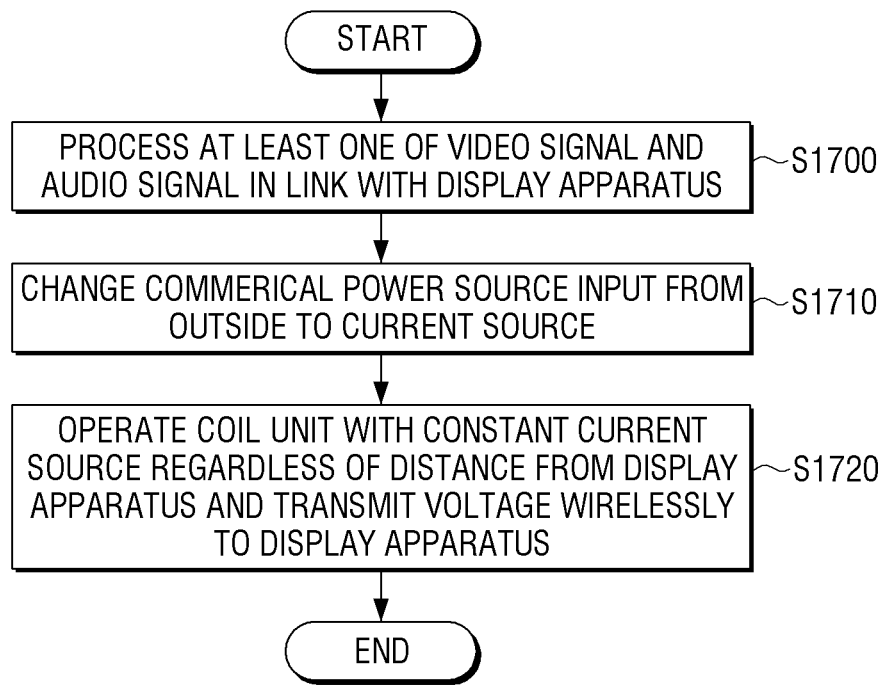
FIG. 17 is a flowchart to explain a driving process of an electronic apparatus according to an embodiment of the present disclosure.

FIG. 17 is a flowchart to explain a driving process of an electronic apparatus according to an embodiment of the present disclosure.

For ease of explanation, referring to FIG. 17 together with FIG. 2, an electronic apparatus according to an embodiment of the present disclosure, for example, the image relay apparatus 200 may be linked to the display apparatus 210 and process at least one of a video signal and an audio signal at step S1700. For example, when the electronic apparatus is the sound output apparatus 110 as in FIG. 1, an audio signal may be received from the display apparatus 100 to be output.

The electronic apparatus may change commercial power input from an outside into a current resource at step S1710. The LC parallel resonance circuit may be provided at a front end of the first coil unit of the electronic apparatus.

The electronic apparatus may operate the coil unit, for example, the first coil unit with a constant current source regardless of the distance from the display apparatus 210, and wirelessly transmit a voltage to the display apparatus 210 at step S1720.

When the electronic apparatus operates with the constant current source, a constant voltage may occur in the first coil unit, and target power may be generated considering only the variables due to the change in inductance of the second coil unit according to the distance. Therefore, it is easy to generate target power.

While the present disclosure has been described that all elements of an embodiment are coupled to one another or operate in combination, it is to be understood that the present disclosure is not limited to the disclosed embodiments. That is, within the scope of the present disclosure, all of the elements may be selectively coupled to one another in one or more of combinations. In addition, although all of the elements may be implemented as one independent hardware, some or all of the elements may be selectively combined to embody as a computer program including a program module performing a part or all of the functions in one or a plurality of hardware. The codes and code segments that constitute a computer program may be easily deduced by those skilled in the art. Such a computer program may be stored in a non-transitory computer readable medium readable by a computer, readable and executed by a computer, thereby realizing an embodiment of the present disclosure.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

Although exemplary embodiments have been shown and described, it will be appreciated by those skilled in the art that changes may be made to these exemplary embodiments without departing from the principles and spirit of the present disclosure. Accordingly, the scope of the present disclosure is not construed as being limited to the described exemplary embodiments, but is defined by the appended claims as well as equivalents thereto.

What is claimed is:
1. A display apparatus, comprising:
a resonance circuit unit configured to generate a voltage by using an inductive electromotive force generated via an external apparatus;
a capacitance variance unit comprising a plurality of switching elements and configured to vary a capacitance (Cv) of the resonance circuit unit by varying a duty ratio of the plurality of switching elements, wherein the duty radio is determined based on a distance between the display apparatus and the external apparatus, to adjust a resonance point of the resonance circuit unit to compensate for a shift in the resonance point being shifted due to the distance between the display apparatus and the external apparatus being changed; and a display panel configured to display an image by using the voltage.

2. The display apparatus as claimed in claim 1, wherein the resonance circuit unit comprises:
   a first capacitor connected to one side of a coil unit of which one side terminal generates the inductive electromotive force; and
   a second capacitor connected to another side of the coil unit and another side terminal of the first capacitor,
   wherein the capacitance (Cv) of the resonance circuit unit is varied by varying a capacitance of the second capacitor.

3. The display apparatus as claimed in claim 2, wherein the plurality of switching elements comprises:
   a first switching element in which a drain terminal is connected to the other side terminal of the first capacitor, and a first control signal is input to a gate terminal; and
   a second switching element in which a drain terminal is connected to the other side of the coil unit, a source terminal is connected to the first switching element, and a second control signal is input to a gate terminal.

4. The display apparatus as claimed in claim 3, wherein at least one of a driving frequency of the first switching element and the second switching element or a duty of the first control signal and the second control signal is determined based on a distance between the external apparatus and the coil unit and whether a resonance circuit for forming a current source is present in the external apparatus.

5. The display apparatus as claimed in claim 4, wherein the duty according to the distance is determined in a section where the first switching element and the second switching element operate oppositely, and
   wherein the capacitance (Cv) varies depending on the determined duty.

6. The display apparatus as claimed in claim 5, wherein the first switching element and the second switching element, based on a current flowing in a reverse direction to a diode included in a switching element, or additionally added to an outside within a designated operational range, and a voltage of both ends of a switching element being zero or close to zero, turns on a switching element in advance and turns off the switching element at a desired time to perform a zero voltage switching (ZVS) operation.

7. The display apparatus as claimed in claim 3, wherein a duty of the first control signal and the second control signal is determined based on the distance between the external apparatus and the coil unit and whether a resonance circuit is present for forming a current source in the external apparatus, and
   the capacitance (Cv) of the resonance circuit unit is determined by an equation:

$$C_v = \frac{C_p}{1 - 2D - \frac{1}{\pi}\sin 2\pi D}$$

where D denotes the duty, and Cp denotes the capacitance of the second capacitor.

8. The display apparatus as claimed in claim 3, further comprising:
   a rectifier connected to the resonance circuit unit and the capacitance variance unit and configured to rectify an output voltage of the resonance circuit unit,
   wherein the rectifier comprises a first diode and a second diode in which anode terminals are respectively connected to drain terminals of the first switching element and the second switching element, and cathode terminals are commonly connected to a load line.

9. A method for driving a display apparatus, the method comprising:
   generating a voltage by using an inductive electromotive force generated via an external apparatus;
   varying a capacitance (Cv) of a resonance circuit unit by varying a duty ratio of a plurality of switching elements of the resonance circuit unit, wherein the duty radio is determined based on a distance between the display apparatus and the external apparatus, to adjust a resonance point of the resonance circuit unit to compensate for a shift in the resonance point being shifted due to the distance between the display apparatus and the external apparatus being changed; and
   implementing an image by using the voltage.

10. The method as claimed in claim 9, wherein the resonance circuit unit comprises:
    a first capacitor of which one side terminal is connected to one side of a coil unit which generates the inductive electromotive force; and
    a second capacitor connected to another side of the coil unit and another side terminal of the first capacitor, and
    wherein the varying the capacitance (Cv) comprises varying a capacitance of the second capacitor.

11. The method as claimed in claim 10, wherein the varying the capacitance (Cv) further comprises:
    varying the capacitance of the second capacitor by using at least one of a driving frequency of a first switching element and a second switching element or a duty of a control signal which controls the first switching element and the second switching element, among the plurality of switching elements,
    wherein each of the first switching element and the second switching element has a drain terminal connected to a different terminal among side terminals of the second capacitor.

12. The method as claimed in claim 11, wherein at least one of the driving frequency or the duty is determined based on a distance between the external apparatus and the coil unit and whether a resonance circuit for forming a current source is present in the external apparatus.

13. The method as claimed in claim 11, wherein the duty according to the distance is determined in a section where the first switching element and the second switching element operate oppositely, and
    wherein the capacitance (Cv) varies depending on the determined duty.

14. The method as claimed in claim 11, wherein the duty of the control signal is determined based on the distance between the external apparatus and the coil unit and whether a resonance circuit, for forming a current source, is present in the external apparatus, and
    wherein the method further comprises:
    determining the capacitance (Cv) by an equation:

$$C_v = \frac{C_p}{1 - 2D - \frac{1}{\pi}\sin 2\pi D}$$

where D denotes the duty, and Cp denotes the capacitance of the second capacitor.

15. The method as claimed in claim 11, further comprising:
- rectifying an output voltage of the resonance circuit unit by a rectifier,
- wherein the rectifier includes a first diode and a second diode including anode terminals, respectively, the anode terminals being connected to drain terminals of the first switching element and the second switching element, respectively, and cathode terminals commonly connected to a load line.

16. The display apparatus as claimed in claim 2, wherein the plurality of switching elements comprises:
- a first switching element having a drain terminal connected to the other side terminal of the first capacitor and a source terminal connected to a load line, and
- a second switching element having a drain terminal connected to the other side of the coil unit and a source terminal connected to the source terminal of the first switching element.

* * * * *